Nov. 28, 1961 J. O. MELTON ET AL 3,010,777
RECORDER WITH SELECTIVE FIVE FOOT MARKER
Filed March 7, 1960 13 Sheets-Sheet 1
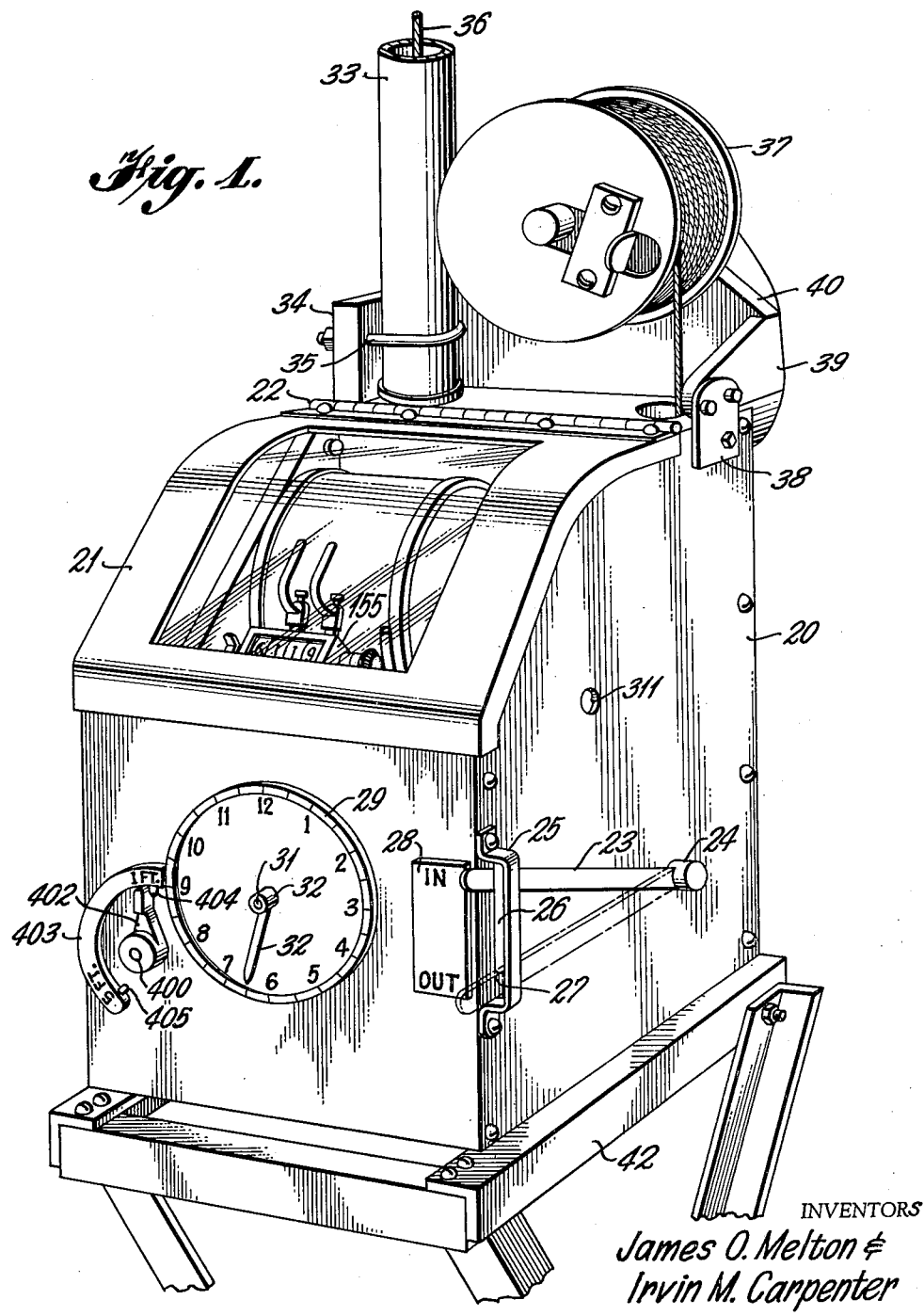
Fig. 1.
INVENTORS
James O. Melton &
Irvin M. Carpenter
ATTORNEYS Nov. 28, 1961  J. O. MELTON ET AL  3,010,777
RECORDER WITH SELECTIVE FIVE FOOT MARKER
Filed March 7, 1960  13 Sheets-Sheet 4

INVENTORS
James O. Melton &
Irvin M. Carpenter
BY *Stevens, Davis, Miller & Mosher*
ATTORNEYS

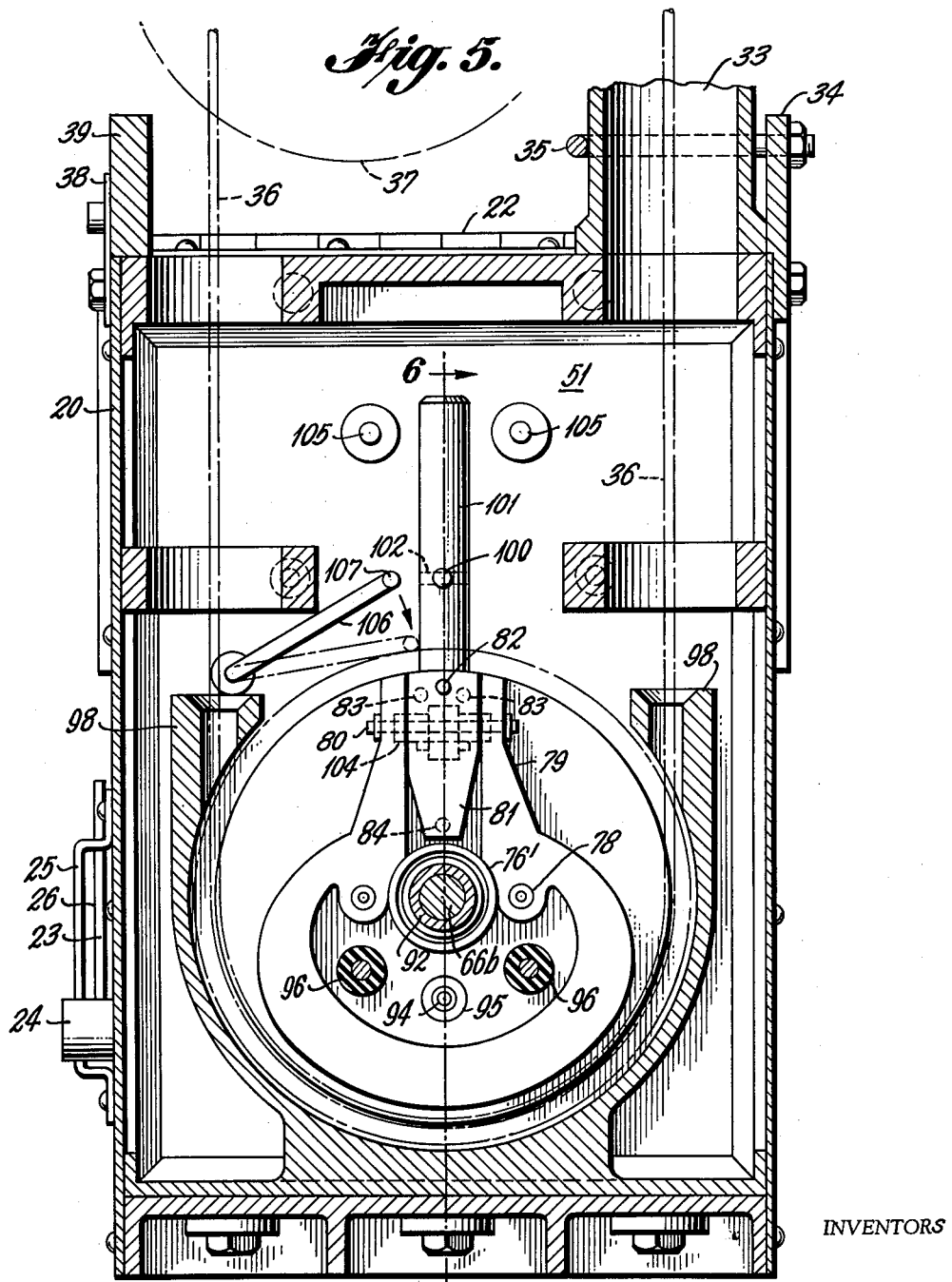

Nov. 28, 1961 J. O. MELTON ET AL 3,010,777
RECORDER WITH SELECTIVE FIVE FOOT MARKER
Filed March 7, 1960 13 Sheets-Sheet 6

INVENTORS
*James O. Melton &
Irvin M. Carpenter*
BY *Stevens, Davis, Miller & Mosher*
ATTORNEYS

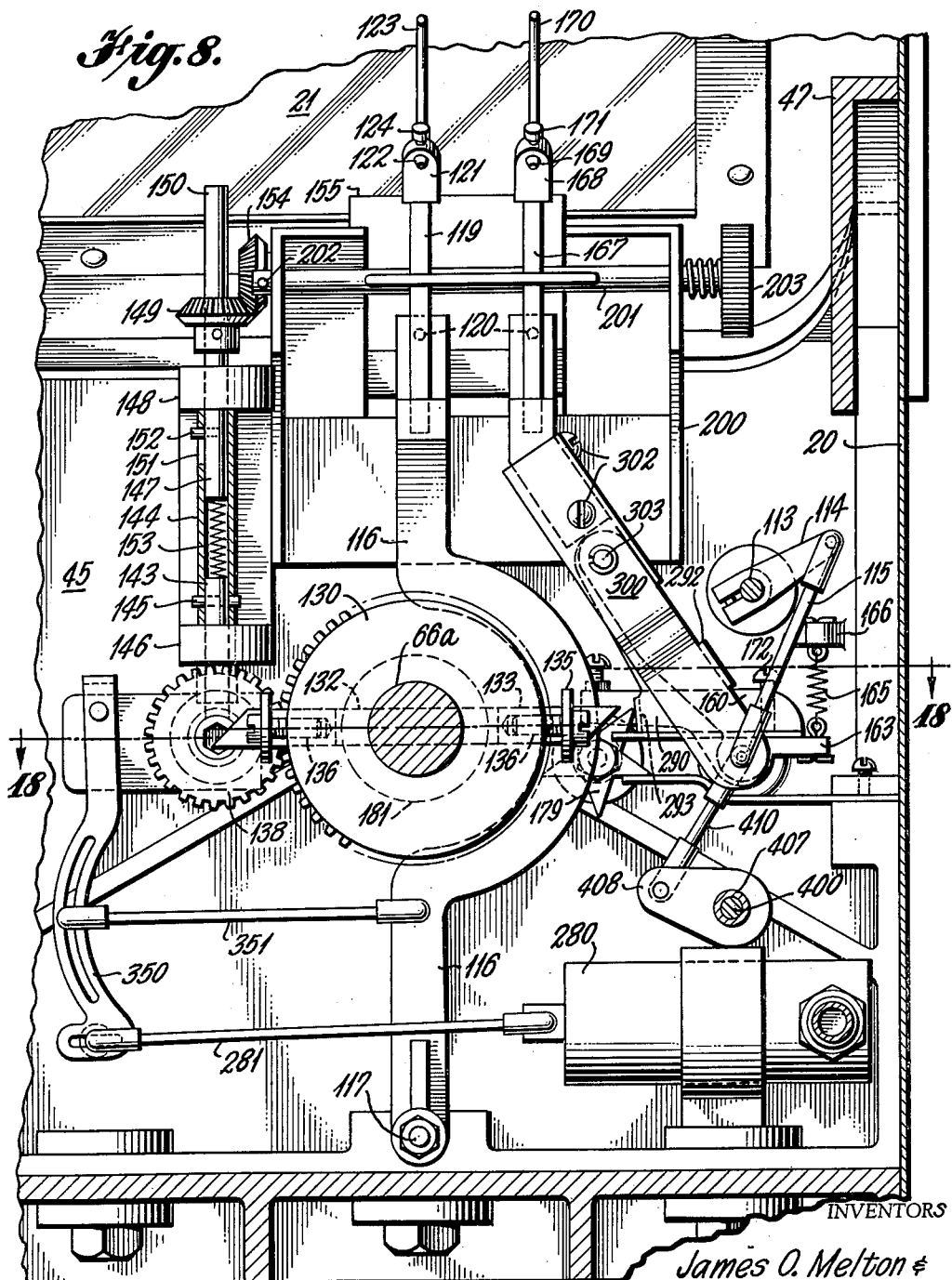

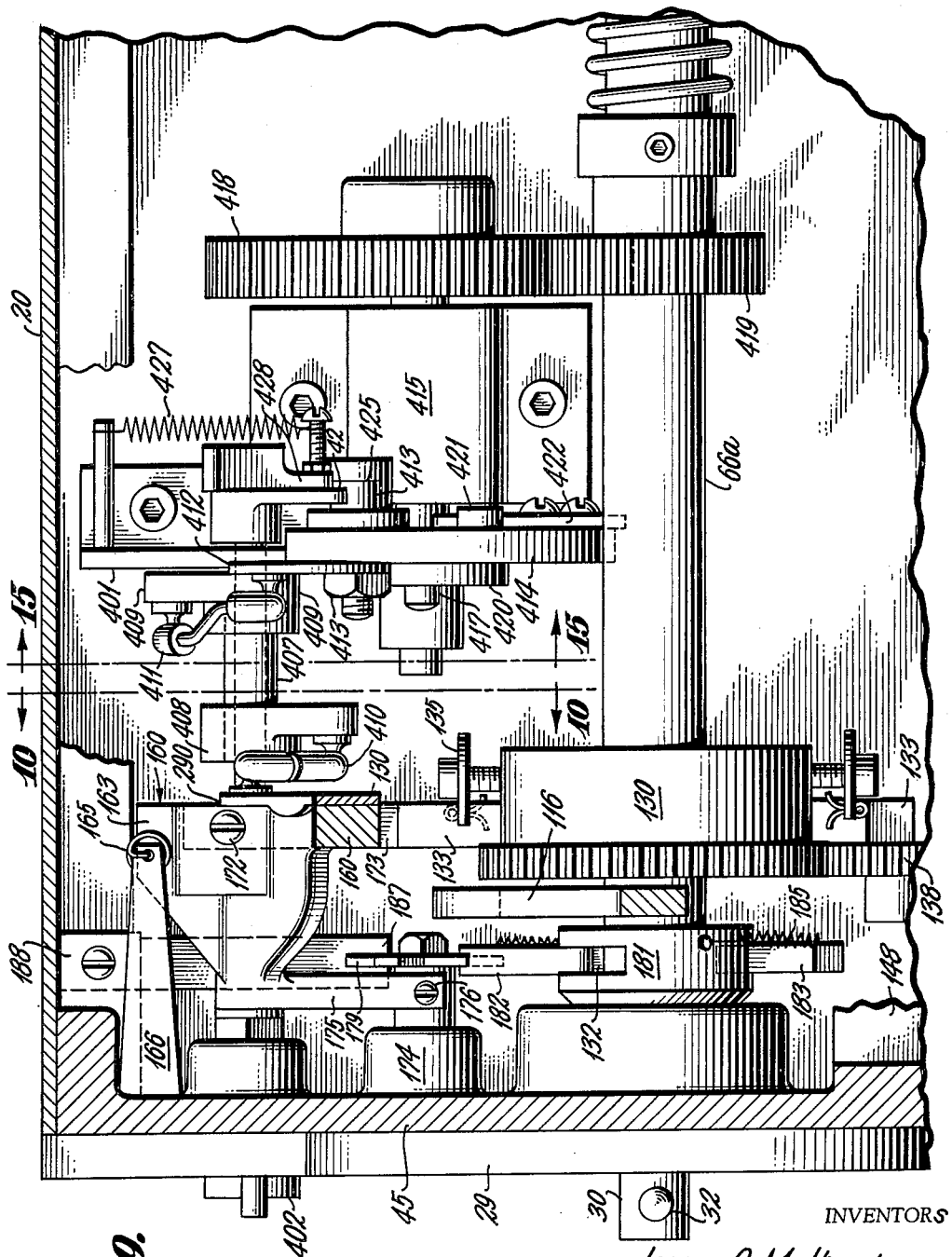

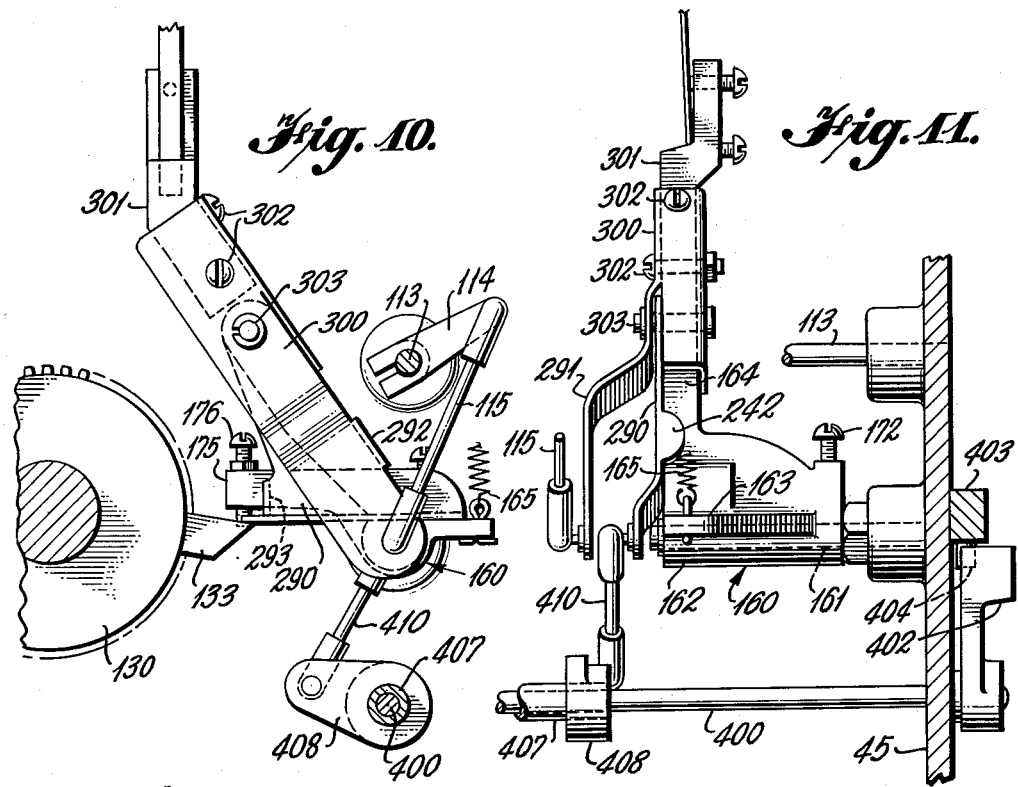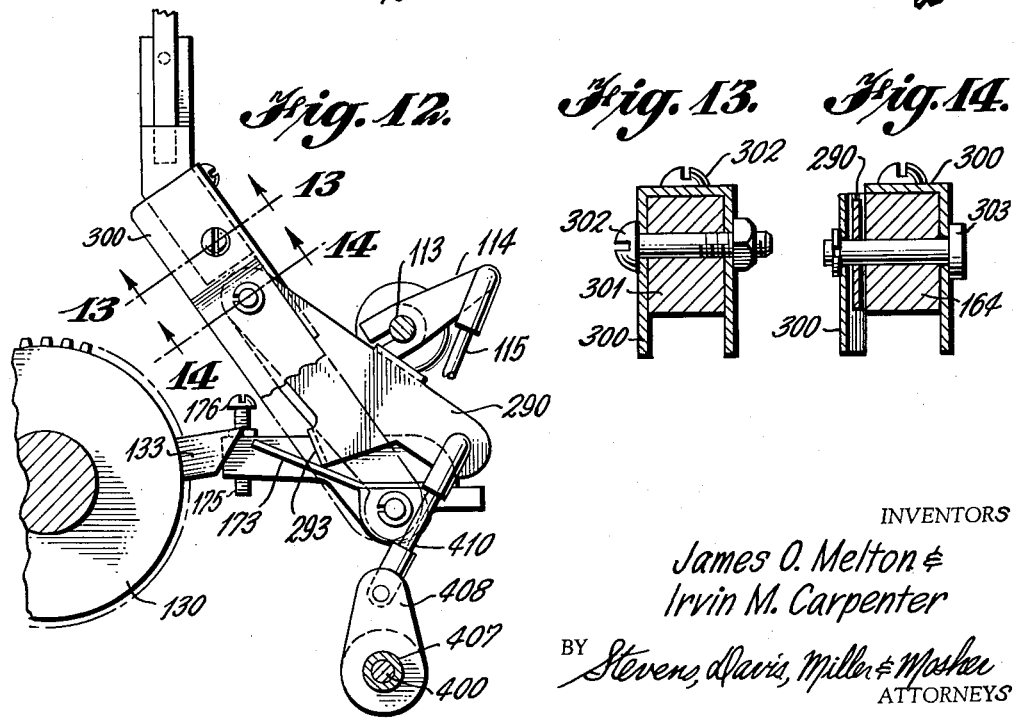

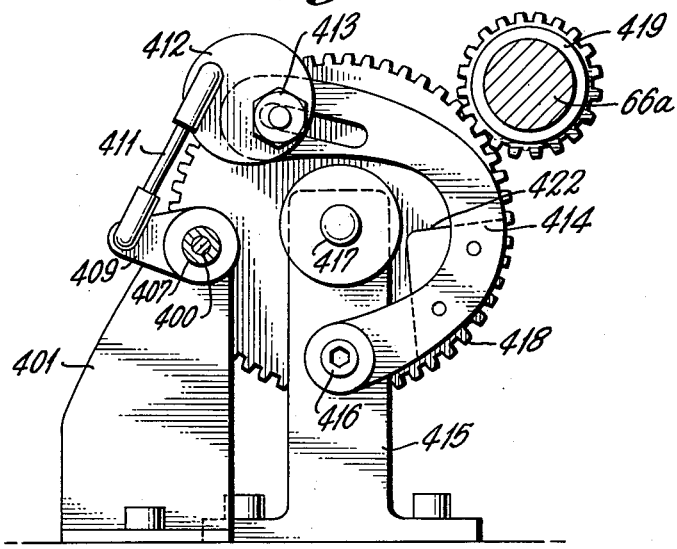
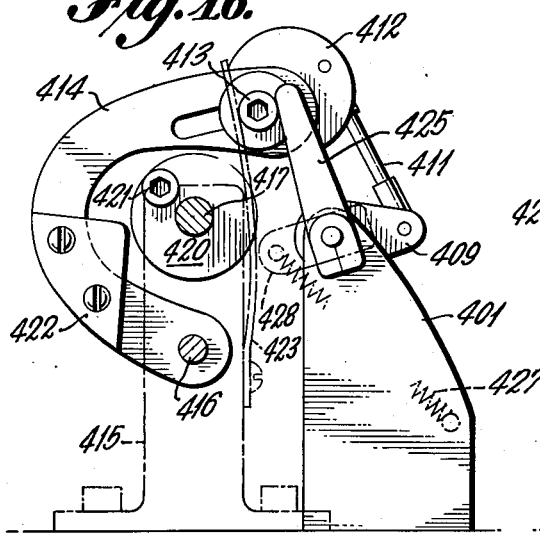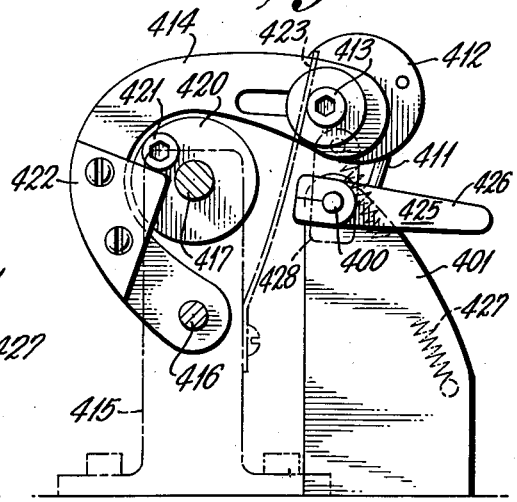

Nov. 28, 1961   J. O. MELTON ET AL   3,010,777
RECORDER WITH SELECTIVE FIVE FOOT MARKER
Filed March 7, 1960   13 Sheets-Sheet 11

INVENTORS
*James O. Melton &*
*Irvin M. Carpenter*

BY *Stevens, Davis, Miller & Mosher*
ATTORNEYS

Nov. 28, 1961  J. O. MELTON ET AL  3,010,777
RECORDER WITH SELECTIVE FIVE FOOT MARKER
Filed March 7, 1960  13 Sheets-Sheet 13

INVENTORS
James O. Melton &
Irvin M. Carpenter
BY Stevens, Davis, Miller & Mosher
ATTORNEYS _United States Patent Office_ 3,010,777
Patented Nov. 28, 1961

3,010,777
RECORDER WITH SELECTIVE FIVE FOOT MARKER
James O. Melton, Norman, and Irvin M. Carpenter, Oklahoma City, Okla., assignors to The Geograph Company, Oklahoma City, Okla., a corporation of Oklahoma
Filed Mar. 7, 1960, Ser. No. 13,362
6 Claims. (Cl. 346—33)

This invention pertains to an apparatus capable of recording various pertinent data relative to a drilling operation. This invention constitutes a general improvement over the type of device disclosed in U.S. Patent No. 2,883,256 and a more specific improvement over the device disclosed in co-pending U.S. application Serial No. 576,485, filed April 5, 1956.

In U.S. Patent No. 2,883,256, a stylus is provided for recording a penetrating trace on a chart which is movable at a uniform rate relative to the stylus. During the drilling operation, the stylus will be deflected horizontally across the chart from a given reference line (vertical) and immediately back again to this reference line each time that the drill bit penetrates one foot into the earth. Also, for each alternate foot means are provided for varying the amount of the horizontal deflection. Thus, the resulting penetration trace will appear essentially as a vertical reference line having a plurality of horizontal lines projecting outwardly therefrom and to one side thereof. The distance (measured along the vertical line) between any given horizontal line and the next succeeding horizontal line represents the time required to drill the intervening foot. Therefore, assuming that the proper weight is on the drill bit, etc., when the horizontal lines are spaced relatively far apart, one can readily perceive that the drilling is occurring at a relatively slow rate. On the other hand, when the horizontal lines are spaced close together, one can see that the drilling operation is proceeding at a relatively fast rate.

One disadvantage of the above apparatus (of U.S. Patent No. 2,883,256) resides in the fact that the horizontal lines become too closely spaced for very fast drilling, for example, when passing through loosely packed sand or similar material. In some instances, these horizontal lines become so close together that they are contiguous such that the resulting trace is practically one large mass of ink. At any event, the lines are so close together that it becomes difficult (or impossible) to read the record so as to use the same for any practical purpose.

The present invention obviates the above-described disadvantage by providing a means whereby the horizontal deflection can be caused to occur only every fifth foot so that, under conditions of fast drilling, a readable and useful record can still be produced. The present invention, nevetheless, permits a horizontal deflection for every foot under normal (or slower) drilling conditions, but, when the rate increases beyond a certain amount, one merely turns a handle which then permits a horizontal deflection for every fifth foot only.

Therefore, it is a principal object of the present invention to provide, in a recorder of the type referred to above, a means for permitting the horizontal deflection of the penetration stylus for every fifth foot only.

It is a further object of the present invention to provide a recorder of the type referred to above wherein the penetration stylus may be connected selectively to deflect horizontally for every foot or for every fifth foot during any given drilling operation.

Other and further objects and advantageous features of the present invention will appear hereinafter in connection with a detailed description of the drawings wherein:

FIGURE 1 is a view in perspective of the recording apparatus of the present invention;

FIGURE 5 is a view in section of the apparatus illustrated in FIGURE 2 taken along line 5—5;

FIGURE 6 is a view in section of FIGURE 5 taken along line 6—6;

FIGURE 7 is a view in section of FIGURE 6 taken along line 7—7;

FIGURE 8 is a view in section of FIGURE 2 taken along line 8—8;

FIGURE 9 is a view in section, on an enlarged scale and with certain parts removed, taken along section line 9—9 of FIGURE 2, showing details of the novel mechanism which permits the recorder to operate selectively as a five-foot marker or as a one-foot marker;

FIGURE 10 is a view in section taken along section line 10—10 of FIGURE 9, the stylus-deflecting means being shown in the operative position;

FIGURE 11 is a right-hand elevation of the elements shown in FIGURE 10, a portion of the casing being shown in section;

FIGURE 12 is a view similar to FIGURE 10 showing, however, the stylus-deflecting means in an inoperative position;

Figure 18:
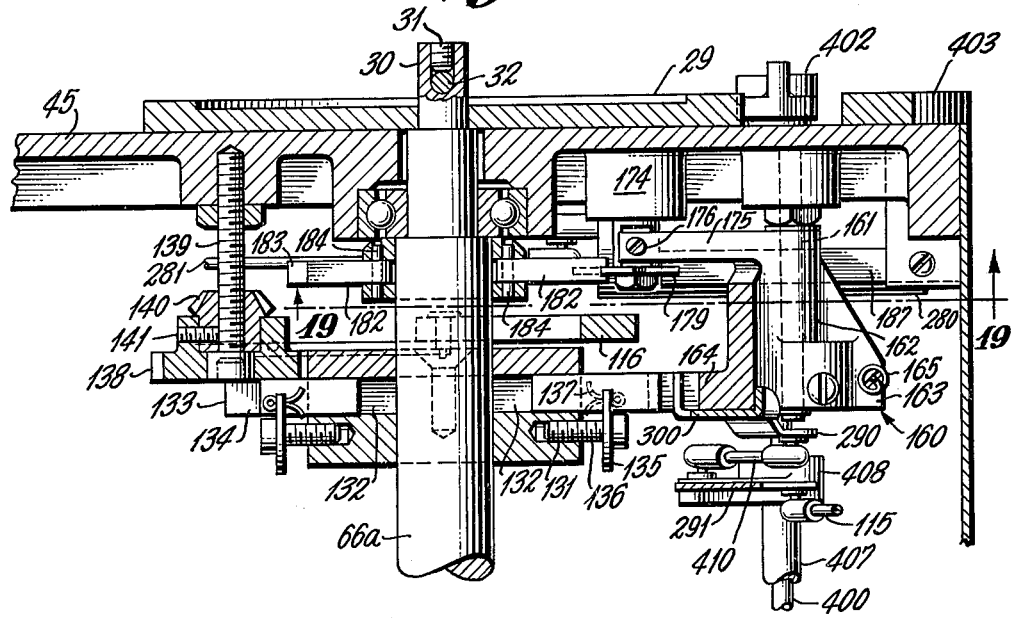
Figure 19:
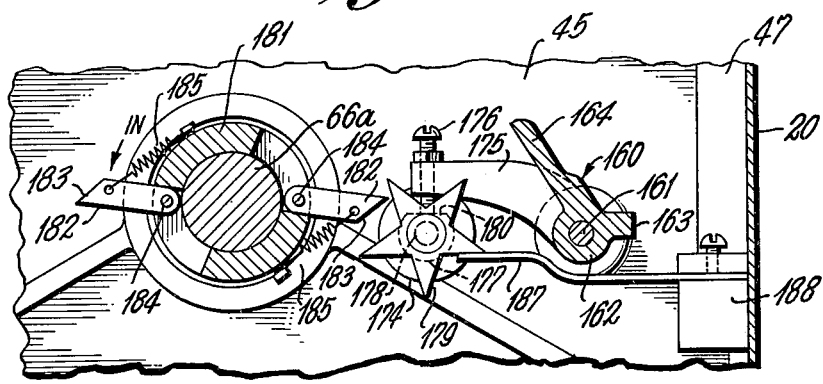
Figure 20:
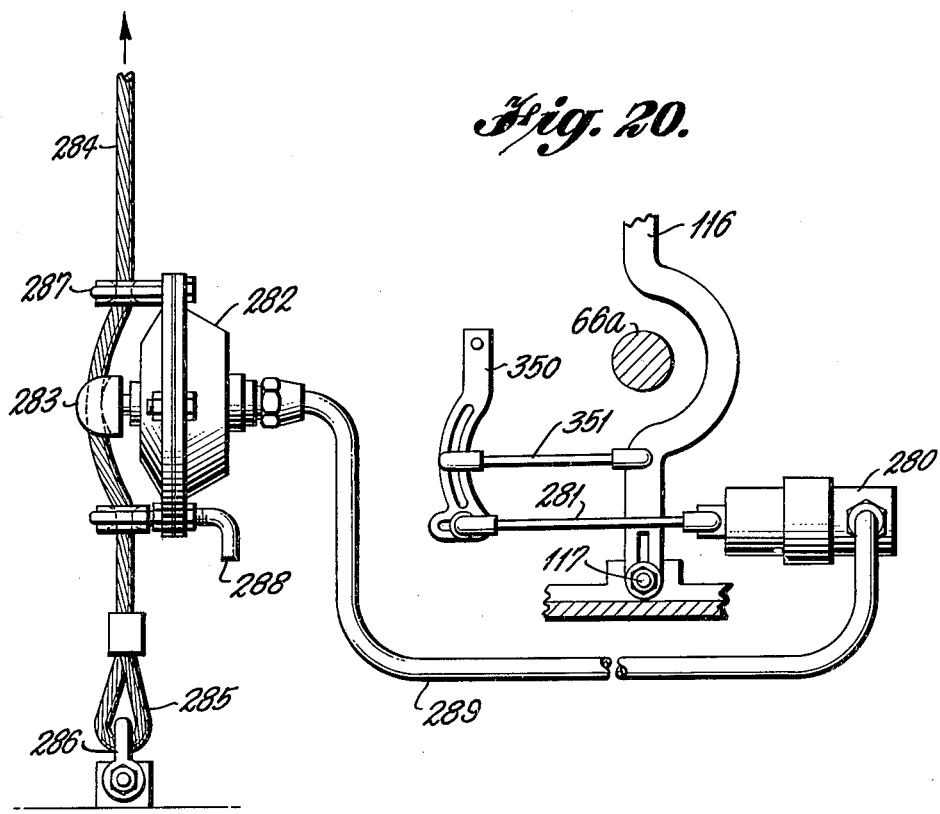
Figure 21:
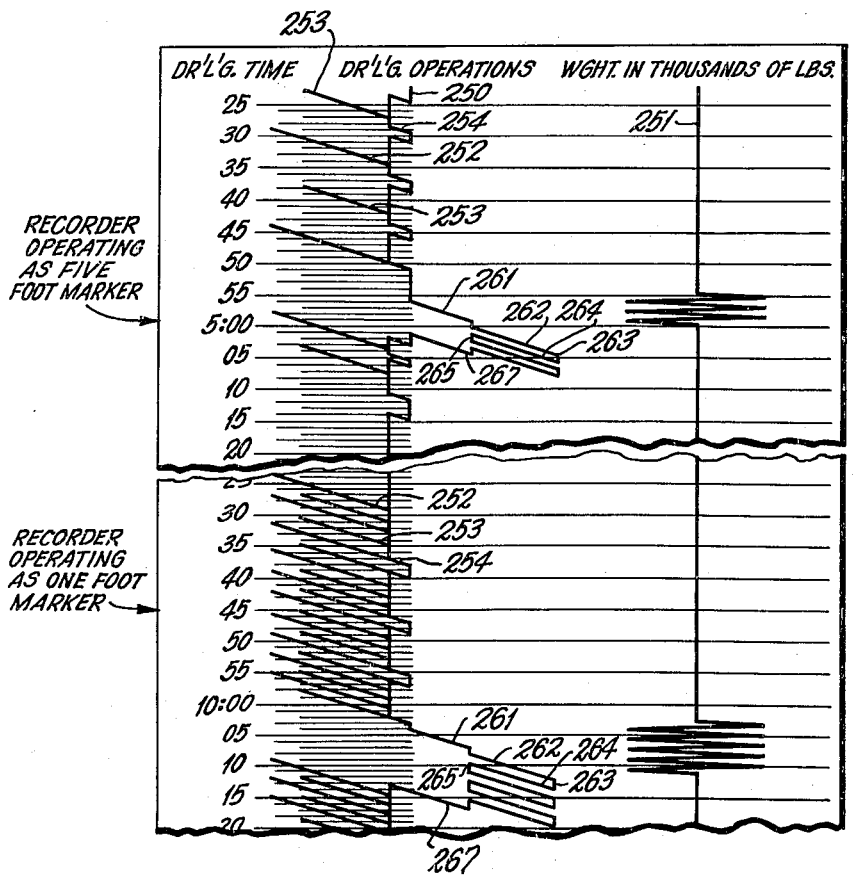

FIGURES 13 and 14 are views in section taken along section lines 13—13 and 14—14, respectively, of FIGURE 12;

FIGURE 15 is a view in section taken along section line 15—15 of FIGURE 9, the relative positions of the elements representing an operating condition of the recorder corresponding to a one-foot marker;

FIGURE 16 is a rear view of the structure shown in FIGURE 15;

FIGURE 17 is a view similar to FIGURE 16 showing, however, the relative positions of the same elements representing an operating condition of the recorder corresponding to a five-foot marker;

FIGURE 18 is a view in section of FIGURE 8 taken along line 18—18;

FIGURE 19 is a view in section of FIGURE 18 taken along line 19—19;

FIGURE 20 is a view in elevation showing the arrangement for sensing the load imposed on the drill rig; and FIGURE 21 is a schematic illustration of the type of chart which is produced by the recording apparatus of the present invention.

Figure 4:
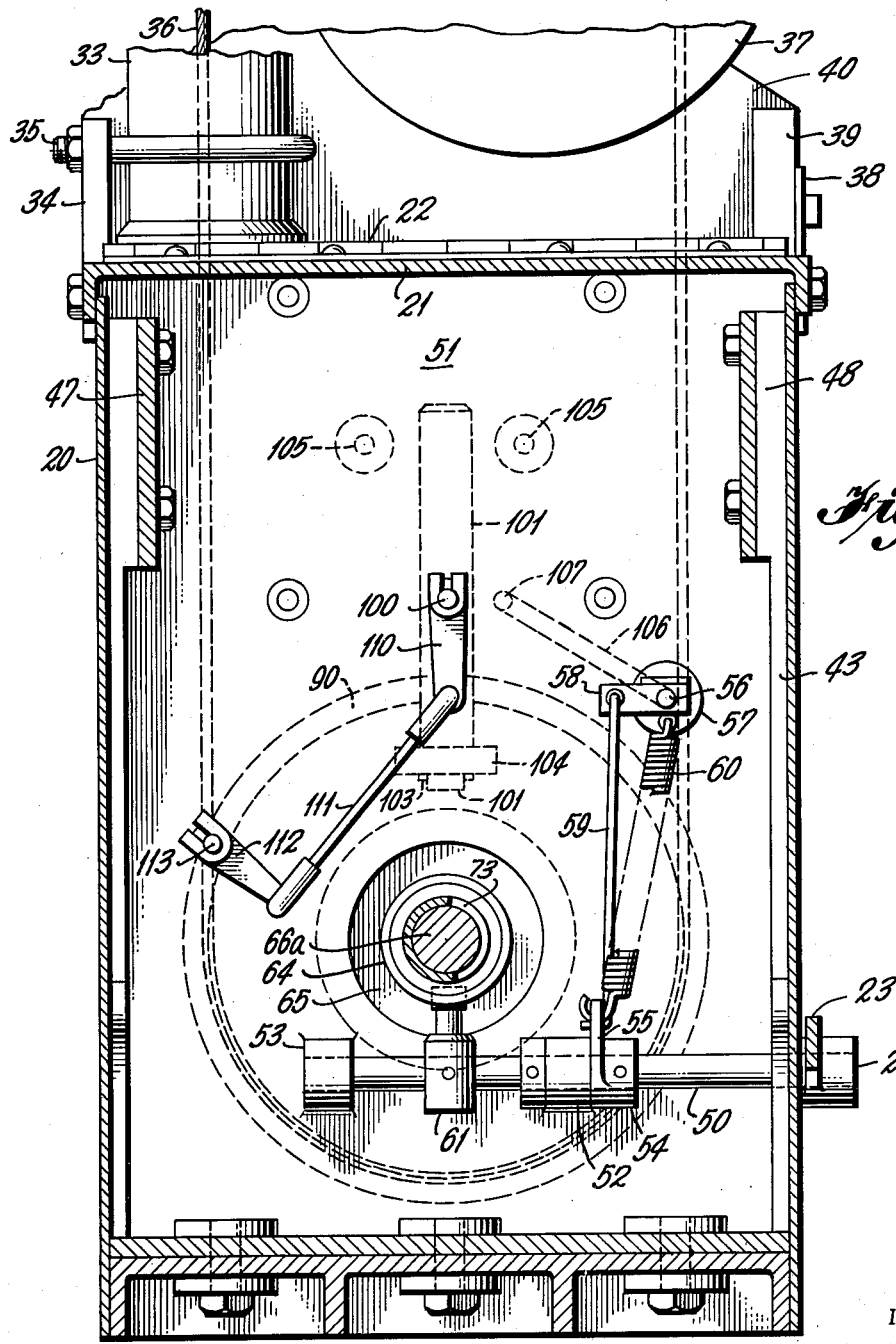
FIGURE 4 is a view in section of the apparatus illustrated in FIGURE 2 taken along line 4—4.

Referring now in detail to the several drawings, FIGURE 1 shows the apparatus of the present invention as viewed in perspective. As shown, the apparatus includes a box-like casing 20 covering a frame, not shown in this view of the apparatus. A cover 21 is hinged along the top of the casing 20 by means of hinge member 22 which enables the cover 21 to be lifted and access to be conveniently gained to the interior of the apparatus. Along the right side of the apparatus is located an operating handle 23 provided at one end with a hub 24 fixed onto a shaft 50 (see FIGURE 4) projecting through the casing 20. The handle 23 is thus pivotally mounted to swing from the position shown in solid lines to the position shown in dot-dash lines. A bracket 25 is attached to the casing 20 and serves as a guide for the forward end of the operating handle 23. The bracket 25 includes a web part 26 which forms an elongated guide slot and which is cut out at its lower end to define a depression 27 which is suitably shaped to receive and positively hold the operating handle 23 when in its lowered position. A plate 28 is mounted on the front of the casing 20 and is suitably marked with the indicia "In" and "Out" in positions corresponding with the upper and lower positions of the operating handle 23.

Also mounted to the front of the casing 20 is a dial 29 suitably marked with numerical indicia, as will be evident. A shaft section 30 projects through the front part of the casing 20, and received in the shaft section 30 is a radial pointer 32 fixed in position by a set screw 31. A tube 33 is fixed to the top of the casing 20 by means of a plate 34, attached to the casing 20, and a U-bolt 35 which clamps the tube 33 to the plate 34. A cable 36, attached at one end to the conventional tackle mechanism of the rotary drill rig, passes through the tube 33 and into the apparatus.

On the other side of the apparatus is mounted a winding drum 37 which takes up the cable 36 after it has passed through the apparatus. The winding drum 37 is mounted on the apparatus by means of any suitable bracket arrangement which may consist, for example, of a plate 38 attached to the casing 20, a bracket arm 39 attached to the plate 38, and a twisted bracket arm 40 integral with the bracket arm 39. On the free end of the twisted bracket arm 40 is mounted a shaft 41 upon which is received the winding drum 37. Connected with the cable winding drum 37 is a suitable mechanism which is normally biased to rotate the drum in a direction to wind cable 36 thereon, but yet is yieldable responsive to pull of the cable 36 to permit unwinding of the cable from the drum 37; being thus arranged, the drum is fully capable of closely following the movements of the drilling string. The means connected to the winding drum 37, although not illustrated in FIGURE 1, may be comprised of a spring motor which is normally tensioned to rotate the drum in wind-up direction. As illustrated in FIGURE 1, the apparatus may be located at any convenient point with respect to a drilling operation. The apparatus, as will be evident, is completely self-contained and requires no auxiliary apparatus or independent source of power for its proper function. As illustrated in FIGURE 1, the apparatus is shown located upon a stand 42.

The hub 24 of the operating handle 23 is fixed to the end of shaft 50 (see FIGURE 4) which projects through the casing 20. Internally of the casing 20 is located a side frame element 43 and a frame partition 51. Shaft 50 is bearing-supported by means of brackets 52, 53, attached to the frame partition 51, and by the side frame element 43. Received on and fixed to the shaft 50 is a collar 54 carrying integral therewith a radial finger 55. Journaled in the frame partition 51 vertically spaced above the shaft 50 is a short stub shaft 56. For this purpose, a hub 57 is integrally fixed onto the frame partition 51 or alternatively the hub 57 may conveniently be cast as an integral part of the frame partition 51. Attached to the end of stub shaft 56 is one end of arm 58, the other end of which is connected by means of a rigid link 59 to the end of radial finger 55. Additionally, a spring 60 is connected at one end to the radial finger 55 and at its other end to an eye formed on the end of arm 58 fixed to the stub shaft 56. The spring 60 acting on the radial finger link 55 biases the shaft 50 in a manner to hold the operating handle 23 normally in its upper, or "In" position.

A collar 61 (see FIGURE 6) fixed to the shaft 50 between the brackets 52 and 53 is characterized by a radially projecting stub pin 62 which fits in a groove 63 cut in hub 64 of a clutch plate 65. The clutch plate 65 is keyed to a shaft section 66a which, together with shaft section 66b and 66c constitutes the main drive shaft of the apparatus. Shaft section 66c, the end section, is received and held at one end in rear frame plate 44 through the agency of ball bearing assembly 67 and, thus, is free to rotate relative to plate 44. As will be evident from FIGURE 6, the shaft section 66a defines with shaft section 66b a shoulder 68, and likewise, the shaft section 66b defines with shaft section 66c a second shoulder 69. In the vicinity of the shoulder 69, shaft section 66c is threaded as indicated by the numeral 70. Fixed onto the shaft section 66a is a collar 71 by means of a set screw 72. Received on the shaft section 66a between the collar 71 and the hub 64 of the clutch plate 65 is a compression spring 73. By virtue of this arrangement, the spring 73 normally urges the clutch plate 65 to the right as viewed in FIGURE 6 so that the plate will assume the solid-line position which appears in this figure. The handle 23, in these circumstances, will be in its upper or "In" position. By moving the operating handle 23 from its upper position to its lower position, the shaft 50 will be rotated counter-clockwise as viewed in FIGURE 6 and, hence, the stud 62 will swing to the left. This movement of stud 62 will result in the clutch plate 65 being forced to the left on the shaft section 66a against the bias of spring 73 and the movement will continue until hub 64 and clutch plate 65 assume the positions indicated by the dotted lines in FIGURE 6.

The face of the clutch plate 65 is provided with an annulus 74 composed of a material having desirable frictional characteristics. A second clutch plate 75 is mounted on the shaft section 66b through the medium of a ball-bearing assembly 76' and, hence, the clutch plate 75 is free to rotate relative to the shaft section 66b. As shown in FIGURE 6, the clutch plates 65 and 75 are engaged and thus any rotational movement of either clutch plate will be imparted to the other. On the other hand, when the clutch plate 65 is in its retracted position, as illustrated by the dotted lines, it will be disengaged from the clutch plate 75 and thus motion of one clutch plate will not be imparted to the other.

The clutch plate 75 is provided with an annular flange 76 of substantially reduced thickness. Attached to the other face of the clutch plate 75 is a yoke 77 shown clearly in FIGURE 5. The attachment is effected by means of bolts 78. The upper end of the yoke 77 defines a pair of substantially parallel, spaced-apart arms 79. Journaled in the arms 79 is a shaft 80 upon which is pivotally received a rocker plate 81. A pin 82 threaded through one end of rocker plate 81 projects away from the face of rocker plate 81 remote from the clutch plate 75. Also, a pair of springs 83 are provided at the same end of rocker plate 81 and bias against the face of the rocker plate 81 nearest the clutch plate 75. The arrangement is such that the springs 83 normally bias the rocker plate 81 to assume the position illustrated by the dotted lines of FIGURE 6. However, the other end of the rocker plate 81 is beveled on its face nearest the clutch plate 75, and, when the clutch plates 65 and 75 are engaged, the rocker plate 81 is rocked by a pin 84 in a direction opposite to the bias of the springs 83. The pin 84 extends through a bore in the clutch plate 75 and abuts against the clutch plate 65.

A pulley wheel 90 is also mounted on the shaft section 66b by means of a ball-bearing assembly 91. A bearing collar 92 is provided to serve as a spacer for the ball-bearing assembly 76 and 91. A nut 93 is screwed onto the threaded section 70 of the shaft section 66c and bears against the ball-bearing assembly 91 thereby securely locking the assemblies 76, 91 and collar 92 against a shoulder cut in clutch plate 75. As will be noted from FIGURE 6, the cable 36, which passes through the tube 33, passes around the pulley wheel 90 and thereafter is led to the winding drum 37. A lost motion connection is provided between pulley wheel 90 and clutch plate 75 such that the latter will be forced to rotate with the former, but only after pulley wheel 90 has rotated through a predetermined arc.

The lost motion connection is comprised as follows:

A stub 95 is attached to the clutch plate 75 by means of a bolt 94. Similar stubs 96, peripherally spaced apart, are mounted on the face of the pulley wheel 90 adjacent the yoke 77, the mounting means likewise being the same. The stub 95 is located in a position between the stubs 96 and on the same arc, in accordance with the showing of FIGURE 5.

According to the above description, when the operating handle is in the upper or "In" position, the clutch plates 65 and 75 will be coupled or engaged and the pin 82 of the rocker plate 81 will be in its withdrawn position with respect to the pulley wheel 90 due to the influence of pin 84. Accordingly, rotation of the pulley wheel 90 by virtue of travel of cable 36 will result in rotational movement of the clutch plate 75 through the lost motion connection at such time when the stub 95 strikes against one of the stubs 96. Thereafter, the clutch plate 75 will closely follow the rotary movement of the pulley wheel 90, as long as the direction of rotation remains the same. Should the direction of rotation of pulley wheel 90 be reversed, the pulley wheel 90 will rotate relative to clutch plate 75 until the stubs 96 strike against the other stub 95 of clutch plate 75. Thus, any vibratory or oscillatory motions occuring in the pulley wheel 90 will be substantially dampened during transmission of rotary movement to the clutch plate 75 by virtue of the lost motion connection.

When, however, the operating handle 23 is in the lower or "Out" position, the clutch plate 65 and 75 will be uncoupled and also the pin 84 will be in the dotted line position and to the left (FIGURE 6) no longer resisting the biasing effect of the springs 83. Accordingly, the rocker plate 81 will be rocked by springs 83 into the position illustrated in dotted lines in FIGURE 6, in which position the pin 82 will be in firm contact and engagement with the face of the pulley wheel 90. In this condition, any and all movements of the pulley wheel 90 will be directly imparted to the clutch plate 75 through the medium of the yoke 77 and, more specifically, through the pin 82. Thus, any vibratory or oscillatory movements of the pulley wheel 90 will not be dampened, but rather will be directly imparted to the clutch plate 75.

A pair of cable guides 98 (see FIGURE 5) which are tubular in nature are mounted within the casing to receive the cable and guide it around pulley 90. As will be appreciated the cable 36 is introduced into the apparatus through tube 33, passes through one guide 98, around the pulley 90, through the other guide 98, out of the apparatus, and is taken up by drum 37.

A shaft 100 (see FIGURE 6) is journaled in the rear frame plate 44 and projects through and is bearing-supported by the frame partition 51. Received on the shaft 100 is a rod 101 which is fixed to the shaft 100 by means of pin 102. At the lower end of the rod 101 is provided a turned-down section 101a provided with a radial bore. Fitted into the radial bore and projecting from either side of the section 101a is a pin 103. Mounted onto the reduced section 101a and resting on the pin 103 is a pick-up means consisting of a horse-shoe shaped permanent magnet 104 with the poles of the magnet resting against the flange 76 of the clutch plate 75. Thus, rotation of the clutch plate 75 in either direction will drag the permanent magnet 104 with it, thus pivoting the rod 101 about the axis of shaft 100. Since the rod 101 is fixed to the shaft 100, the latter will have imparted to it rotary motion in a direction depending upon the direction of rotation of the clutch plate 75. To limit the movement of the rod 101 symmetrically relative to clutch plate 75, there are provided a pair of stops 105 fixed to the frame partition 51 on either side of the rod 100, as will be evident from FIGURE 5.

Connected to, or integral with, the stub shaft 56 on the opposite side of the frame partition from the arm 58 is an arm 106 provided with a right angle bend at its free end to define stop 107. When the operating handle 23 is located at the "In" position, the arm 106 and stop 107 will be in the position shown in solid lines in FIGURE 5 and will be removed from the rod 101 leaving same free to swing between the two stops 105. When, however, the operating handle 23 is depressed to the "Out" position, the arm 106 and stop 107 are pivoted to the position shown in dotted lines in FIGURE 5 by virtue of the mechanical connection between the arm 107 and the shaft 50 in the form of radial finger 55, link 59, arm 58 and stub shaft 56. With the arm 106 and stop 107 in its new position, the rod 101 is restrained to swing only between the stop 105, as shown in FIGURE 5, to the left of the rod 101 and the stop 107. In other words, it will be evident that the swing of the rod 101 is reduced to about one-half of its normal swing with the arm 106 and stop 107 in their elevated position.

Attached to the end of shaft 101, projecting from the frame partition 51 is an arm 110. Pivotally connected to the end of arm 110 is one end of link 111, the other end of which is pivotally connected to the free end of arm 112 (see FIGURE 4). The arm 112 is fixed onto a shaft 113 one end of which is bearing mounted in the frame partition 51 and the other end of which is bearing mounted in the front frame plate 45 (see FIGURE 3). Fixed onto the shaft 113 adjacent the forward end of the apparatus is an arm 114 the free end of which is pivotally connected with a link 115 (see FIGURE 8). The other end of the link 115 is pivotally connected with one end of a shoe 300.

The shaft section 66a extends toward the front of the apparatus and is journaled into a hub cast as a part of the front frame plate 45 by means of a ball bearing assembly 46 (see FIGURE 18). The main drive shaft projects through the front frame plate 45 and terminates in reduced shaft section 30 as previously described in conjunction with FIGURE 1. The shaft section 66a extends through the plane of a pen support bracket 116 and, thus, the bracket in the region of the shaft section 66a is provided with a portion (see FIGURE 8) that curves around the shaft section 66a. The lower end of bracket 116 is mounted on a stub shaft 117 fixed onto the front frame plate 45. The upper part of the bracket 116 is provided with a projecting housing 118 having a bore therein. Received in this bore, is a leaf spring element 119 which is held in position by means of a set screw 120 (see FIGURE 2) which is arranged to control the biasing effect of the leaf spring element 119. Attached to the other end of the leaf spring element 119 is a pen holding bracket 121 having a bore in which is received the recording tip 122 of a recording pen 123. To maintain the positioning of the tip 122 and pen 123, the bracket 121 also includes a threaded bore in which is received a set screw 124 that bears against the pen 123. The pen 123 is of the self-contained type and, thus, the marking medium is contained in the barrel of the pen 123. When the supply of marking medium is exhausted, it is only necessary to loosen set screw 124, remove the pen 123 and substitute a fresh one.

A large collar 130 is mounted on the forward end of the shaft section 66a, spaced from the front frame plate 45, said collar having a diametrically opposed pair of threaded holes 131 (see FIGURE 18). Likewise, the collar 130 defines a pair of rectangular recesses 132 each of which is axially aligned with one of the threaded holes 131 (see also FIGURE 8). Received in each of the recesses 132 is an arm 133 rectangular in cross-section and cut with a beveled surface 134 at its outer projecting extremity. In addition, each arm 133 is cut with a slot opening in the direction of its respective threaded bore 131. A locking assembly for adjustably positioning the arms 133 in the slots 132 and for controlling the extent that the arms 133 project from the collar 130 is provided for each arm 133, and each assembly consists essentially of a flange-headed set screw 136 being threaded into each threaded bore 131 with the flange 135 of the screw 136 being received in the slot of the respective arm 133. A cotter pin 137 passes through one of a series of peripherally spaced holes in the peripheral edge portion of each flange 135 to restrict threading action of the set screw 136 relative to the arm 133. Thus, the cotter pins 137 prevent the set screws 136 from being moved more than about three-quarters of a turn and thus effectively lock the arms 133 in their fixed positions. In the normal set up of the apparatus, it is preferred that one of the arms 133 projects away from the collar 130 a slightly greater distance than does projection of the other of the arms 133. The reason for this will become more apparent from the description hereinafter.

Fixed to the forward face of collar 130 is a spur gear 130′, the teeth of which are in meshing engagement with a smaller spur gear 138. This latter spur gear 138 is bearing mounted and cantilever supported on one end of a stub shaft 139 which is threaded at its other end into the front frame plate 45. Also bearing mounted on the stub shaft 139 is a bevel gear 140 which is keyed to rotate with the spur gear 138 by virtue of set screw 141. In meshing engagement with the bevel gear 140 is a second bevel gear 142 fixed to the end of a shaft 143 (see FIGURES 2 and 8). A housing 144 surrounds the shaft 143 and a pin 145 extending through both the housing 144 and shaft 143 keys these two elements for rotation in common. The shaft 143 is supported by a bracket portion 146 which is cast as a part of the front frame plate 45. Also, the lower end of the housing or sleeve 144 rides on the upper surface of the bracket part 146. Also received within the sleeve 144 at its upper end is a shaft 147 which projects upwardly through a second bracket part 148, preferably cast as part of the front frame plate 45, and has fixed thereon above the bracket part 148 a bevel gear 149. The shaft 147 projects above the bevel gear 149 and terminates in a rounded head 150. The sleeve 144 is provided with a slot 151, and a pin 152, sliding in the slot 151, is fixed to the shaft 147. Thus, the sleeve 144 and shaft 147 are likewise keyed for rotation in common. The upper end of the sleeve 144 rides against the undersurface of the bracket part 148. A spring 153 is housed in the sleeve 144 between the shaft 147 and the shaft 143 resiliently forming the lower support for shaft 147.

The bevel gear 149 is in meshing engagement with a bevel gear 154 fixed to the end of a register operating shaft, not shown, which directly drives register 155 conveniently mounted on the front plate 45. As will be evident, the force of spring 153 insures meshing of the bevel gears 149 and 154. Should it be desired to reset the register 155, the bevel gear 149 may be easily and readily disconnected from the bevel gear 154 simply by depressing the shaft 147 against the bias of spring 153 until the two bevel gears 149 and 154 are clear. This may readily be accomplished by exerting a manual force against the round head 150 of the shaft 147. With the bevel gears 149 and 154 clear, the register may be reset as desired.

In accordance with the above description, rotation of the shaft section 66a will drive the register through the gearing and shaft connections as set forth. Although it is possible to vary the ratio of the gears in many respects, it is preferable that each rotation of shaft section 66a represents two linear feet of cable travel. Thus, for each one-half turn of the shaft section 66a, the register 155 should advance one unit. In this regard, the circumference of the pulley wheel 90 must be preselected at 24 inches.

A bell crank 160 (see FIGURES 8 to 12, 18 and 19) is pivotally mounted and cantilever supported on a stub shaft 161 having one end fixed to the front frame plate 45. The bell crank 160 is essentially comprised of a hub part 162 and integral ear 163 located on one side of the shaft 161 and a crank arm 164 located on the opposite side of the shaft 161. The ear 163 is connected by means of spring 165 to a bracket projection 166 preferably cast as part of the front frame plate 45. By virtue of spring 165, the bell crank is biased in a counterclockwise direction as viewed in FIGURE 8.

A pivotal shoe 300, the upper central poriton of which defines a U-shaped channel that partially envelopes the upper end of the crank arm 164, is pivotally mounted on the crank arm 164 by means of bolt 303. The upper end of the pivotal shoe 300 is rigidly attached to a pen holding arm 301 by means of bolts (or screws) 302. The lower end of a leaf spring element 167 is mounted at the upper end of the pen holding arm 301 in substantially the same manner that leaf spring element 119 is mounted on the bracket 116. To the other end of leaf spring element 167 is attached a pen holding bracket 168 which defines a bore that receives the recording tip 169 of a recording pen 170. As before, a set screw 171 is provided to retain the tip 169 in the bore of bracket 168. In all respects, the mounting and the design of the pen 170 is similar to the pen 123.

The crank arm 164 has two pivotal members associated with it; i.e., the pivotal shoe 300 (described above) and an intermediate pivotal plate 290, which is essentially in the form of a triangle and which is pivotally mounted on the bolt 303 for pivotal movement between the shoe 300 and the crank arm 164. As indicated above the shoe 300 is U-shaped in its upper central portion; thus, when the shoe 300 is in the position shown in FIGURES 8 and 10, the corresponding part of the U-shaped channel portion is resting against the edge of the crank arm 164 so as to prevent further pivotal movement, in a clockwise direction, of the shoe 300. The lower end 291 of the shoe 300 is bent outwardly, as best shown in FIGURE 11, and is connected to the lower end of the link 115.

The intermediate pivotal plate 290 is provided with a tab 292 which is bent at right angles to the plate 290 and which, in the same manner as the U-shaped channel portion of the shoe 300, serves to limit the pivotal movement of the plate 290 relative to the crank arm 164. The pivotal plate 290 is also provided with a forward tab 293, the purpose of which will appear below.

The bell crank 160 is provided with a substantially horizontal slot in the region between the crank arm 164 and the ear 163. A leaf spring element 173 is suitably received in this slot and held in position by means of set screw 172. The left-hand end of the spring has been pre-bent so that it tends to assume the position shown in FIGURE 12. However, it should be noted that the spring 173, at any event, is bearing against the lower edge of tab 293 such that, when the plate 290 is in the position shown in FIGURE 10, the spring 173 is substantially horizontal (straight) and is in a position to be intercepted by the outer ends of the lugs 133. Again, when the plate 290 is in the position shown in FIGURE 10, the elements 164, 173, 290, 300 and 301 behave substantially as a single unit so that as shaft section 66a rotates in a counter-clockwise direction, the extreme tip of each arm 133 will contact the extreme end of the leaf spring element 173 and force the bell crank arm 164, the hub 162 and the ear 163 to rotate about the axis of shaft 161 in a clockwise direction against the pull of spring 165 until the extreme end of leaf spring element 173 has moved sufficiently to the right, as viewed in FIGURE 8, to permit the arm 133 to pass.

It will be noted, as shown in FIGURE 8, that the ball connection of the extension to link 115 is at a point substantially coaxially located with respect to shaft 161. As will be evident, rotation of shoe 300 about the pivot point defined by bolt 303 in a clockwise direction as seen in FIGURE 8 is not possible. On the other hand, rotation in a counter-clockwise direction is possible and will result in arm 301 being moved independently of arm 164 and plate 290. Thus, movements can be imparted to arm 301 from magnet 104 via rod 101, shaft 100, arm 110, link 111, arm 112, shaft 113, arm 114, and link 115 will cause the pen 170 mounted in arm 301 to swing to the left of its position as shown in FIGURE 8, and such movements of arm 301 and pen 170 will be independent of arm 164.

The arrangement of arms 164 and 301 and shoe 300 is such, however, that oscillations imparted to arm 164 from the shaft section 66a via arms 133 and leaf spring element 173 forcing arm 164 to swing to the right of its position shown in FIGURE 8 will naturally result in arm 301 also swinging to the right of its position shown in FIGURE 8. This is so because of the connections (screws or bolts 302, 303) between the shoe 300 and the two arms 164, 301.

Hence the swinging movement of the bell crank arm 164 which has previously been described in detail will cause the recording pen 170 to be moved to the right as viewed in FIGURE 8. Since, as previously explained, one of the arms 133 projects further from collar 130 than the other arm 133, the swinging movements imparted to the crank arm 164 will be of different amounts depending upon which of the arms 133 strikes the end of the leaf spring element 173. As will be also noted, the apparatus is preferably designed, as previously mentioned, so that each complete revolution of the shaft section 66a corresponds to two linear feet of cable travel. Because the arms 133 are located on a diameter of the collar 130, attached to the shaft section 66a, an arm 133 will strike against the free end of the leaf spring element 173 at a point in time corresponding to one linear foot of cable travel (assuming that plate 290 is retained in the position shown in FIGURE 10).

The purpose of the beveled surface 134 at the end of each arm 133 is to prevent actuation of the crank arm 164 whenever the shaft section 66a is being rotated in a clockwise direction. In these circumstances, the beveled surface of the arm 133 will strike against the upper surface of the free end of the leaf spring element 173 and will merely force its way past without actuating the crank arm 164. As will be evident, the extreme tip of each arm 133 does not project sufficiently to strike against the crank arm or the plate 290 (see FIGURE 8).

Also, integral with the hub 162 is a second arm 175. The free end of arm 175 is provided with a set screw 176 which rides on the surface of a cam 177. A shaft 178 (see FIGURES 18 and 19) is supported in a hub 174 cast as part of the front frame piece 45. Bearing mounted on shaft 178 is the cam 177 and a five-point star wheel 179, with the cam 177 and star wheel 179 being integrally formed or rigidly attached together for rotation in common. The surface of cam 177 is cylindrical and defines at one area a flat plateau generally designated by the numeral 180. Fixed on the shaft section 66a is a collar 181. Two pawls 182, each having a beveled edge 183 at its free end, are pivotally mounted into one end of arcuate slots in the collar 181 by means of pins 184. The free end of each pawl 182 is resiliently biased against the end of its respective slot by means of spring 185 extending from the free end of each pawl 182 to a point on the collar 181 peripherally spaced from the pin 184 according to the illustration of FIGURE 19. The pawls 182, as mounted, can pivot in a counter-clockwise direction against the bias of spring 185 but are restrained against movement in a clockwise direction since they bear against the ends of the slots in collar 181. The extreme end of each pawl 182 is cut at an incline and the tip thus defined cooperates with the star wheel 179. For each full rotation of the shaft section 66a, each pawl 182 will engage the star wheel 179 once and move same one-fifth of a turn. A star wheel follower is provided in the form of leaf spring element 187 which is mounted at one end to a bracket 188 attached to or cast as a part of side frame plate 47 and its free end engages with the star wheel 179.

Whenever the star wheel has rotated so that the set screw 176 comes to rest on the plateau 180, the arm 175 will necessarily pivot slightly in a counter-clockwise direction, as viewed in FIGURE 10, during the movement of the set screw 170 from the cylindrical surface of cam 177 to the plateau 180. This slight counter-clockwise movement of the arm 175, as viewed in FIGURE 10, will be reflected by hub 162, ear 163 and crank arm 164 which will also move slightly in a counter-clockwise direction. The force for this movement is supplied, as will be appreciated, by the action of spring 165. When this condition occurs, the pen 170 which is attached to arm 301 which, in turn, is attached to the crank arm 164 via shoe 300 will move slightly to the left, as viewed in FIGURE 8. Since each revolution of shaft section 66a represents two linear feet of cable travel, the pen 170 will be moved slightly to the left after five linear feet of cable travel and will remain in this position for the next linear foot of cable travel.

Figure 2:
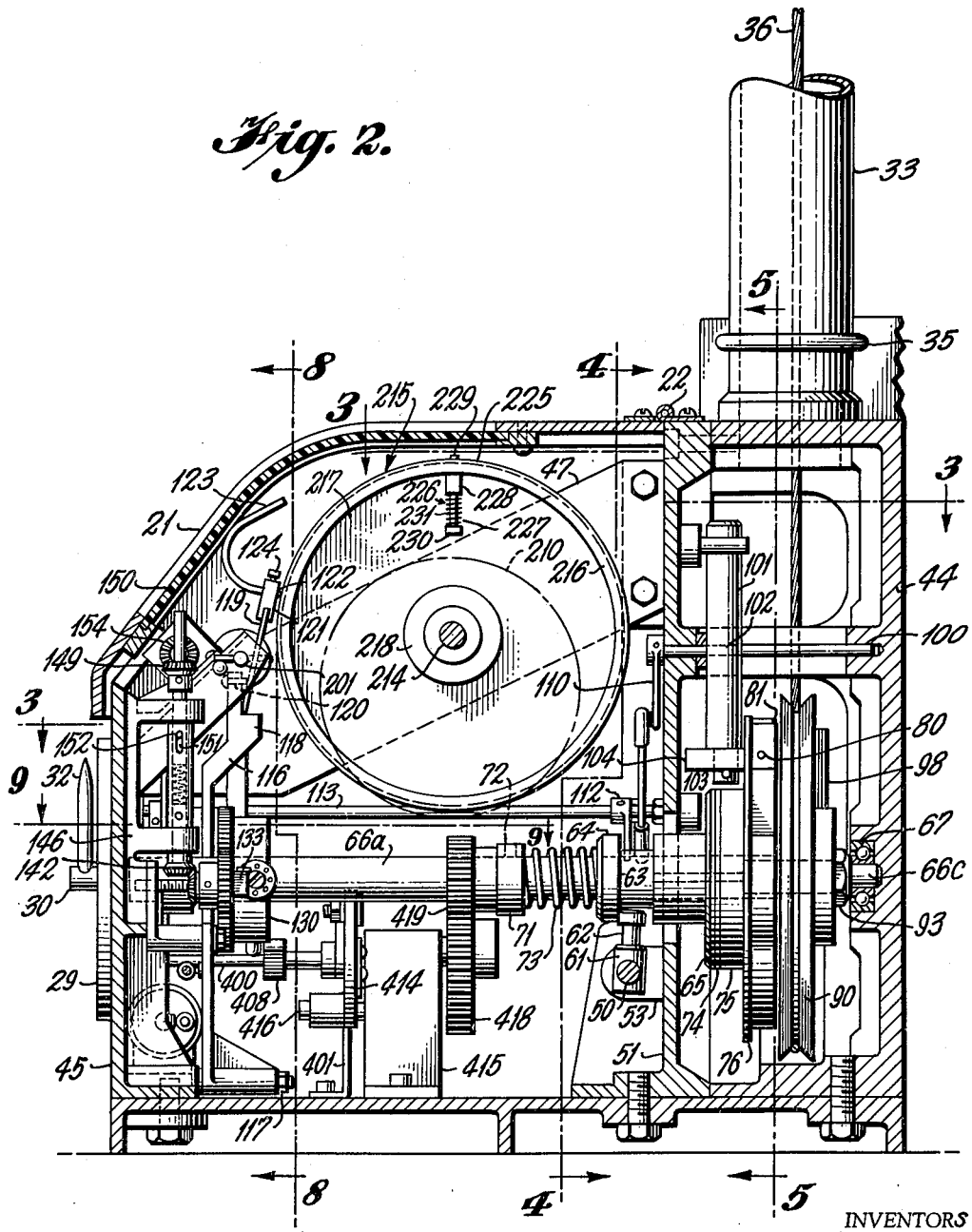
FIGURE 2 is a view in section of the apparatus illustrated in FIGURE 1 with the right side removed.
Figure 3:
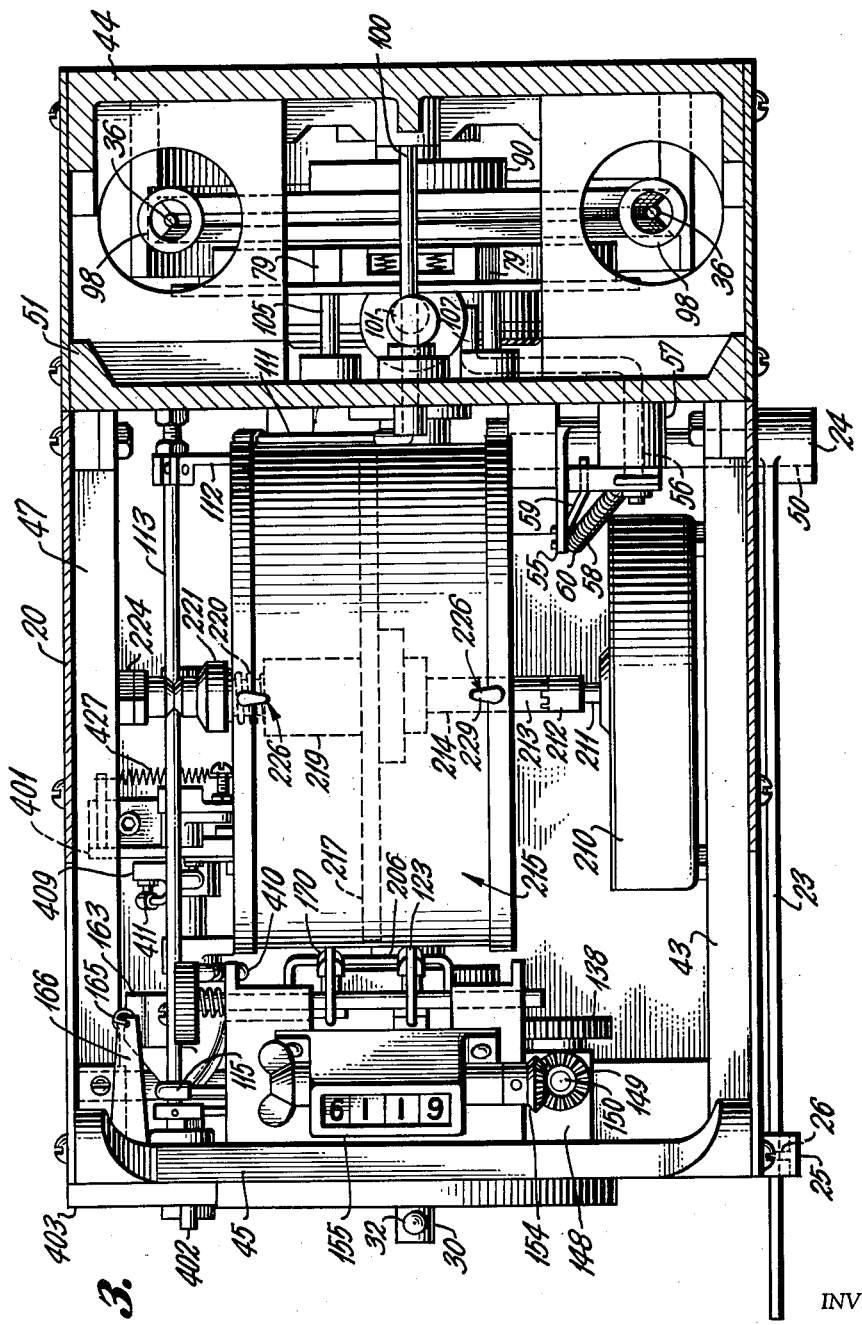
FIGURE 3 is a view in section of the apparatus illustrated in FIGURE 2 taken along line 3—3.

Cast as a part of the front frame plate 45 is a yoke consisting of two projecting legs 200 (see FIGURES 3 and 8). Journaled into and bearing supported by the legs 200 is a rod 201 which extends behind the leaf spring elements 119 and 167 as seen in FIGURE 8. A pin 202 is fixed into one end of the rod 201 on the outside face of one of the legs 200 and a knob 203 is fixed to the other end of the rod 201 outside of the other leg 200. Between the knob 203 and the leg 200 a spring 204 is mounted on the rod 201 bearing against the knob 203, biasing the knob 203 and rod 201 to the right as viewed in FIGURE 8, and as a result of this action holding the pin 202 against the outside surface of its respective leg 200. A raised projection 205 (see FIGURE 2) is fixed to the outside surface of the leg 200 in a cooperative relationship with pin 202. A U-shaped bar 206 is connected to the rod 200 and extends in front of the leaf spring elements 119 and 167. With the apparatus as shown in FIGURES 2 and 8, the pens 123 and 170 are free of the U-shaped bar 206 and consequently can function during a recording operation. When, however, it is desired to lift the pens to a non-recording position, it is merely necessary to rotate the rod 201 by manipulating the knob 203 in a counter-clockwise direction as viewed in FIGURE 2, thereby swinging the U-shaped bar 206 upwardly to bear against the leaf spring elements 119 and 167 and to move them to the left out of recording position. During this counter-clockwise rotation of the rod 201, the pin 202 will pass over the projection 205 to its other side. Due to the cooperation between the spring 204 and the rod 201, the lifting assembly will be maintained in its new position until it is manually returned to its original position by suitably manipulating the knob 203 in a clockwise direction.

A spring timing motor 210 (see FIGURE 3) is mounted to the side frame plate 43. Timing motor 210 may be of any type although it is preferred that the motor be of the spring operated type. In order to afford access to the motor 210 to periodically wind it, a hole 311 is defined in the casing 20 and side frame plate 43 to permit insertion of a key. Projecting from the timing motor 210 is the timing motor shaft 211 (see FIGURE 3). Fixed to the end of shaft 211 is a toothed clutch element 212. In meshing engagement with this clutch element 212 is a complementary toothed clutch element 213 either designed as a part of or attached to shaft 214.

A recording drum 215 is mounted onto the shaft 214 and fixed thereto for rotation in common. The recording drum 215 is made as a ring-like member 216 provided with a centrally located supporting partition 217. Integrally attached with this partition 217 is hub structure 218 into which is fixed shaft 214. Also integrally fashioned with the partition 217 is hub 219. It is preferred that the ring 216, the partition 217 and the hub 219 all be cast as a single element. Received within the hub 219 in sliding engagement therewith is a shaft 220. Fixed to the end of shaft 220 spaced from the end of hub 219 is a collar 221 and mounted on the shaft 220 between the collar 221 and the end of hub 219 is a spring 222. The purpose of this arrangement is to normally bias the shaft 220 to extend out of the hub 219, but at the same time resiliently permit the shaft 220 to be retracted within the hub 219 thereby shortening the overall distance from the clutch element 213 to the end of shaft 220. The extreme end of the shaft 220 is provided with a recess in which is received a plug 223 fixed to the other side frame plate 47 by means of bracket 224. As thus will be evident, the drum 215 is mounted within the apparatus for rotation by the timing motor 210. The surface of the ring 216 functions as the recording surface and the relationship between the drum and the recording pens is such that the leaf spring elements 167 and 119 will normally cause the pens to bear against the surface of the ring 216.

The drum is further characterized by a pair of marginal flanges 225 slightly raised from the surface of the ring 216. A recording chart in the form of a strip of paper is wrapped around the surface of ring 216 between the flanges 225 and is held in position by clips 226. Each clip 226 is composed of a rod 227 which fits through a sleeve 228 attached to the undersurface of the flange 225 and projects through the flange 225. A finger element 229 terminating in a point is connected to the end of the rod 227 and extends over the surface of ring 216. The other end of the rod 227 is provided with an enlarged head 230 and a spring 231 is received on the rod 227 bearing against the head 230 and the lower end of the sleeve 228 biasing the rod 227 downwardly and thus in effect biasing the finger element 229 into contact with the surface of ring 216.

The weight indicator mechanism forming part of the present invention (see FIGURES 8 and 20) is comprised essentially of a piston and cylinder assembly 280 mounted on a plate which in turn is fixed to the frame of the apparatus. The projecting and movable end of the piston is connected by means of link 281 to slotted and pivotally mounted arm 350 which, in turn, is connected by link 351 to arm 116. A weight sensing device consisting of a hydraulic sense unit 282 is arranged with its sense element 283 cooperating with a cable 284 which is fixed at one end to the crown block assembly (not shown) of the drill rig apparatus and at its other end is spliced to form a loop 285 which engages with an eye bolt 286 attached to the floor of the derrick. Cable guides 287 are fixed to the hydraulic unit 282 to guide the cable with reference to the sense element 283. A suitable hydraulic or fluid medium is introduced through fitting 288 to the hydraulic unit 282. The hydraulic output from the unit 282 is directed by means of line or conduit 289 to the input of the assembly 280. It will thus be apparent that the weight placed upon the derrick will be reflected by the crown block of the rigging which, in turn, will cause cable 284 to become more tensioned or less tensioned. This, in turn, will actuate the sense element 283 of unit 282 causing the piston of assembly 280 to project from or be withdrawn into the cylinder. The arm 116 will follow movements of the assembly 280 by virtue of the links 281, 350 and 351. Motions imparted to the arm 116 will be recorded on the moving chart by the pen 123. The links 281 and 351 can be adjustably positioned in the slot of arm 350 and then fixed. By this means, there is provided a desirable adjustment in the mechanical connection from assembly 280 to arm 116. Although the weight indicator apparatus has been described in conjunction with a hydraulic unit, it will be appreciated that this assembly can be replaced by an equivalent pneumatic unit or mechanical unit. Thus, for example, in place of using a hydraulic medium, it is possible to employ, with substantially the same type of apparatus, a fluid such as air. Further, the sense element 283 may be arranged as a spring biased plunger and connected to an enclosed cable similar to the type of cable employed as the choke cable of an automobile. With this type of hook-up, the enclosed cable could be directly connected to the arm 116. In place of using the assembly 280, it is conceivable to use other types of expansion and contraction elements, such as for example a Bourdon tube or bellows.

In the above description, reference has been made to operation of the present recorder as a one-foot marker based upon the assumption that the pivotal plate 290 is retained in the position shown in FIGURE 10. However, if the pivotal plate 290 is moved to the position shown in FIGURE 12, it should be quite apparent that the arms 133 will no longer be able to strike against the spring 173 to deflect the arm 301 to the right, as was previously the case with regard to FIGURE 10.

In accordance with the present invention means are provided to impose two different conditions of movement, or lack of movement, upon the plate 290. Under one condition, the plate 290 is merely retained in the position shown in FIGURE 10, in which case the recorder operates as a one-foot marker, as described heretofore. Under the second condition, the pivotal plate 290 is moved automatically to the position shown in FIGURE 12 where it is retained, except that, for every fifth foot, it is pivoted again, automatically and is synchronism with the movement of the arms 133, to the position shown in FIGURE 10; following a single contact of the spring 173 by an arm 133, the pivotal plate is automatically returned to the position shown in FIGURE 12 and the action is repeated successively as long as it is desired to operate the recorder as a five-foot marker.

The means for controlling the position of the plate 290 will be described as follows: A shaft 400, parallel with main shaft 66, is supported for rotation between the front frame plate 45 and a vertical bracket 401 suitably secured to the base of the recorder. At the forward end of the shaft 400, a handle 402 is keyed (see FIGURE 1). Handle 402 is movable through an arc of slightly greater than ninety degrees with respect to an arcuate metal strip 403 suitably secured to the outer front wall of the casing 20. Pins 404 and 405, projecting radially inward from the arcuate strip 403, constitute stops for the handle 402 in positions corresponding to the legends "1 ft." and "5 ft.", respectively, on the arcuate strip.

A sleeve 407 is freely rotatably mounted on the shaft 400. Arms or collars 408 and 409 are keyed to the opposite ends of the sleeve 407. Arm 408 is connected to the lower end of pivotal plate 290 by means of link 410. Arm 409 is connected by means of link 411 to a disc 412 which is eccentrically and, therefore, adjustably mounted, by means of bolt 413, on the outer slotted end of a curved and pivotal arm 414. The curved arm 414 is pivotally mounted at its lower end on a vertical support 415 by means of a bolt 416.

A relatively short shaft 417 passes through the vertical support 415 in substantially parallel relation with the main shaft 66a and in such a manner that gear 418, keyed to shaft 417, meshes with gear 419, keyed to shaft 66a. The driving ratio between gears 418 and 419 is 2½ to 1; for example, if gear 419 has 28 teeth, then gear 418 will have 70 teeth. Since one rotation of the shaft 66a corresponds to two linear feet of drilling, each rotation of shaft 417 will correspond with five feet of drilling.

At the opposite end of the shaft 417 is keyed a collar or disc 420 upon which a pin 421 is eccentrically mounted. A triangular plate 422 is mounted on the curved arm 414 in such a manner that its apex will intercept the movement of pin 421 in the position shown in FIGURE 17. Thus, from the position shown in FIGURE 17, continued movement of the shaft 417 in a counter-clockwise direction will force the curved arm 414 to pivot in a counter-clockwise direction until the pin 421 passes the obstruction formed by the triangular plate 422. After the pin 421 passes beyond the plate 422, the curved arm 414 will be returned to the position shown in FIGURE 17 by virtue of the resilient force of the spring 423 which is mounted on the support 415 and which, at its outer end, bears against the outer end of the bolt 413.

As the curved arm 414 moves intermittently in a counter-clockwise direction (FIGURE 17), it should be apparent that link 411 will rotate the arm 409 and, hence, the sleeve 407 in a counter-clockwise direction. Thus turning again to FIGURE 12 (which is a view taken in the same direction as FIGURE 17), counter-clockwise rotation of the sleeve 407 will result in counter-clockwise rotation of the arm 408 and, hence, through the agency of link 410, clockwise movement of the plate 290 about the bolt (pivotal axis) 303. It should be pointed out that the eccentric mounting of the disc 412, the eccentric mounting of the pin 421, the shape of the arm 414, the linkage arrangements, etc., are all adjusted and/or designed so that each movement of the arm 414 will result in a corresponding movement of the plate 290 from the position shown in FIGURE 12 to that shown in FIGURE 10. Also, this movement will be in exact timed relation with the movement of the arms 133 so that a deflection of the pen 170 will occur in correspondence with each movement of the plate 290, thus providing a five-foot marker.

Should it be desired to place the apparatus in condition for operation as a one-foot marker, the handle 402 is thrown to the position shown in FIGURE 1, causing a clockwise rotation of shaft 400 relative to FIGURES 1 and 15, or a counter-clockwise rotation of shaft 400 relative to FIGURES 16 and 17. Therefore, from the FIGURE 17 position (which represents the five-foot marker position of the apparatus) the shaft 400 will rotate in a counter-clockwise position and, with it, bell crank 425 which is keyed to the end of the shaft. Arm (constituting a reset arm or finger) 426 of the bell crank will bear against the end of bolt 413 and will, against the action of spring 423, force the arm 414 into the position shown in FIGURES 15 and 16. Movement of the arm 414 to this position will, as described above, move the plate 290 into the position illustrated in FIGURE 10, in which position it will remain until the handle 402 is again moved to the five-foot position.

The bell crank 425 is retained in either the FIGURE 16 position or the FIGURE 17 position by means of a spring 427 which extends from one end of the other arm 428 of the bell crank to a suitable connection on the support 401. In passing from the FIGURE 17 position to the FIGURE 16 position, or vice versa, it should be noted that the spring 427 passes across the central axis of the shaft 400 and thus serves to retain the bell crank in either extreme position.

The type of recording chart employed in connection with the apparatus of the present invention is illustrated in FIGURE 21. As will be noted, the chart is printed with indicia indicating drilling time in a column at its left edge. Drilling operations and weight are headings provided for the right side of the chart. The recording pen 170 will, in the operation of the apparatus, mark the chart with the line 250. The recording pen 123 in the operation of the apparatus will mark the chart with a second line 251. The speed and depth of a drilling phase will be recorded by the apparatus when the operating handle 23 is located at the "in" position. With the apparatus in this condition, recording will commence when the drill bit has been brought to the bottom of the hole. As drilling commences, the pen 170 will mark line 250 on the recording chart. As will be evident, this record is characterized by a substantially vertical line with frequent short inclined lines extending to the left therefrom. These inclined lines are of two different lengths and are identified by the numerals 252 and 253, representing the longer and shorter lines, respectively. The recording pen 170 is caused to make these side swings due to the action of the arms 133 against the leaf spring 173. Inasmuch as one of the arms 133 projects out further than the other, every other side swing of the recording pen 170 will be of slightly greater length. The distance between each two successive side swings of the recording pen 170 represents an advance of the drill bit into the earth a distance of one foot or five feet depending upon the position of the handle 402, as previously explained, and the distance between two adjacent long swings 252 (or between two adjacent short swings 253) represents an advance of two feet or ten feet, in like manner. For every two and a half rotations of the shaft section 66a, the cam 177 will present its plateau 180 to the set screw 176. When this occurs, the recording pen 170 will shift slightly to the right as indicated by the breaks 254 to the right. These breaks, due to the calibration of the apparatus, will be indicative of an advance of five feet into the hole by the drill bit.

In FIGURE 21, the chart has been divided vertically into two sections, the upper portion corresponding to the operation of the recorder as a five foot marker, and the lower portion of the chart corresponding to the operation of the recorder as a one foot marker.

Thus, between the times of 4:27 and 4:34, the drill bit has advanced five feet; likewise, between the times of 5:04 and 5:07. With regard to the last mentioned time interval, it should be quite apparent that, if the recorder was operating as a one foot marker, the lines would be extremely close together and, thus, very difficult to read.

Starting from a time of about 9:25, the recorder is operating as a one foot marker; thus between the times of 9:29.5 and 9:31, the drill bit has advanced one foot.

When a drilling operation ceases and it becomes necessary to make repairs, pull drill pipe etc., the operating handle 23 is moved to the "Out" position, and, since this results in rod 106 and stop 107 being swung to their position shown in dotted lines in FIGURE 5, the pen 170, through its linkage connecting it with the rod 101, will make the line break 261 by shifting to the right. Thereafter, as the operations in connection with the well are in general first pulling something from the well, the travelling block will be moving upwardly with respect to the derrick and the direction of travel of cable 36 will be reversed to what it was during a drilling phase and thus the direction of rotation of the pulley wheel 90 will be reversed causing the pen 170 to shift to the right and make the line indicated by the numeral 262. The line 263 indicates the elapsed time before the travelling block begins moving downwardly with respect to the derrick. The line 264 indicates that the direction of the travelling block has been reversed and it is moving downwardly with respect to the derrick. The line 265 is indicative of the elapsed time before the travelling block begins moving upward with respect to the derrick. When the drilling operation is to be commenced anew, the operating handle 23 is again moved to the "In" position and the recording pen 170 will shift to the left, making the segment 267.

The line 251 is traced by pen 123 and indicates the weight placed on the derrick or drilling apparatus. The large left and right swings in line 251 are produced by the weight indicator assembly shown in FIGURE 20 and occur principally during the times drill pipe is being pulled from the well as evidenced by their being located opposite the segments 262, 263, 264 and 265 of line 250.

Although the present invention has been described with reference to particular parameters, gear ratios, and dimensions, it is to be fully understood that such statements made hereinbefore are merely illustrative of the present invention and in no way restrict the scope or use of the apparatus as other parameters, gear ratios and dimensions may be employed.

Accordingly, although the invention has been described with reference to specific embodiments, various modifications and changes obvious to one skilled in the art from the knowledge of the present disclosure are deemed to be within the spirit, scope and contemplation of the present invention.

What is claimed is:

1. In a recorder, a pivotally mounted pen arm, a pen mounted at one end of said pen arm and adapted to engage a chart for marking a record thereon, means for resiliently biasing said pen arm into a given reference position, means mounted on said pen arm and having thereon a projecting portion, a deflecting means mounted adjacent said pen arm and being movable in a predetermined path past said pen arm, projection moving means for moving said projecting portion into the path of said deflecting means whereby said pen is deflected intermittently across said chart and selective control means operatively connected to said projection moving means for two different conditions of operation of said projection moving means, said selective control means under one condition of operation maintaining said projection moving means continuously in a position such that said projecting portion remains in the path of movement of said deflecting means, said selective control means under the other condition of operation moving said projection moving means intermittently such that said projecting portion is intermittently placed in said path.

2. A recorder for measuring the movements of a drill string in a drilling operation comprising a frame, a shaft rotatably mounted in said frame, means for rotating said shaft in response to the movements of the drill string, a collar keyed to said shaft, a lug projecting radially outwardly from said collar, a pen arm pivotally supported in said frame adjacent said collar, a pen mounted on one end of said pen arm for engaging a chart and for marking a record thereon, means for resiliently biasing said pen arm into a given reference position, a pivotal plate pivotally mounted on said pen arm, a leaf spring mounted on said pen arm bearing against said pivotal plate and having a projecting portion thereon, means for moving said pivotal plate so that the projecting portion is movable into and out of the path of movement of said lug, whereby, when the projecting portion of said leaf spring is in the path of said lug, said lug will pivot said pen arm against the force of said biasing means to deflect said pen across said chart, and selective control means for selectively controlling the operation of said plate moving means in timed relation with the movement of said drill string through a predetermined amount of movement and for selectively maintaining said plate moving means in such a position that said projecting portion remains continuously in said path.

3. A recorder as set forth in claim 2 wherein said means for moving said pivotal plate and the means for controlling the operation of said plate moving means comprise a second shaft mounted in substantially parallel relation with the first-mentioned shaft, a sleeve freely rotatably mounted on said second shaft, a first collar keyed to one end of said sleeve, a link connected between said first collar and one end of said pivotal plate whereby movement of said sleeve through a given arc will cause said projecting portion to move into and out of position with respect to the path of movement of said lug, a second collar keyed to the other end of said sleeve, a curved arm pivotally mounted on a support adjacent to said second collar, a link connected between the free end of said curved arm and said second collar, a third shaft rotatably mounted in said support and having keyed thereto a disc around which said curved arm is bent, an abutment on said arm projecting radially inwardly toward said third shaft, a pin eccentrically mounted on said disc and engageable with the abutment on said arm for deflecting said arm in response to rotation of said third shaft, means for resiliently urging said curved arm in such a direction that the abutment thereon is in the path of movement of the said eccentrically mounted pin, a first gear mounted on one end of said third shaft, a second gear mounted on said first shaft in driving relation with said first gear, a finger mounted at one end of said second shaft adjacent said curved arm for engaging the free end of said curved arm and for moving said curved arm, in response to the rotation of said second shaft, against the force of said resiliently urging means for said curved arm into a position where said abutment is removed from the path of said eccentric pin, spring means connected to one end of said finger for holding the same in two given positions, and means at the other end of said second shaft for selectively rotating said second shaft into two different positions corresponding to the two given positions of said finger.

4. In a recorder of the type having a pivotally mounted pen arm, a pen mounted at one end of said pen arm and adapted to engage a chart for marking a record thereon, means for resiliently biasing said pen arm into a given reference position, said pen arm having connected thereto a projecting portion, and a deflecting means mounted adjacent said pen arm and being movable in a predetermined path past said pen arm in such a manner as to engage said projecting portion and thereby to deflect said pen across said chart, the improvement which comprises a pivotal plate pivotally mounted on said pen arm, said projecting portion being engaged by and moved by said pivotal plate, means for pivoting said pivotal plate for moving said projecting portion into and out of the path of said deflecting means, and selective control means operatively connected to said plate pivoting means for selectively maintaining said plate pivoting means in such a position that said projecting portion remains continuously in said path and for selectively moving said plate pivoting means such that said projecting portion is moved intermittently into said path.

5. A recorder for measuring the movements of a drill string in a drilling operation comprising a frame, a first shaft rotatably mounted in said frame, means for rotating said first shaft in response to the movements of the drill string, a first collar keyed to said shaft, a lug projecting radially outwardly from said first collar, a pen arm pivotally supported in said frame adjacent said first collar, a pen mounted on one end of said pen arm for engaging a chart and for marking a record thereon, means for resiliently biasing said pen arm into a given reference position, a pivotal plate pivotally mounted on said pen arm, a leaf spring mounted on said pen arm bearing against said pivotal plate and having a projecting portion thereon, means for moving said pivotal plate so that the projecting portion is movable into and out of the path of movement of said lug, whereby, when the projecting portion is in the path of said lug, said lug will move said pen arm against the force of said biasing means to deflect said pen across said chart, a second shaft mounted in substantially parallel relation with said first shaft, a sleeve freely rotatably mounted on said second shaft, a second collar keyed to one end of said sleeve, a link connected between said second collar and one end of said pivotal plate whereby movement of said sleeve through a given arc will cause said pivotal plate to move into and out of position with respect to the path of movement of said lug, a third collar keyed to the other end of said sleeve, a curved arm pivotally mounted on a support adjacent to said third collar, a link connected between the free end of said curved arm and said third collar, a third shaft rotatably mounted in said support and having keyed thereto a disc around which said curved arm is bent, an abutment on said arm projecting radially inwardly toward said third shaft, a pin eccentrically mounted on said disc and engageable with the abutment on said arm for deflecting said arm in response to rotation of said third shaft, means for resiliently urging said curved arm in such a direction that the abutment thereon is in the path of movement of the said eccentrically mounted pin, a first gear mounted on one end of said third shaft, a second gear mounted on said first shaft in driving relation with said first gear, means mounted at one end of said second shaft adjacent said curved arm for engaging the free end of said curved arm and for moving said curved arm in response to the rotation of said second shaft against the force of said resiliently urging means for said curved arm into a position where said abutment is removed from the path of said eccentric pin, a spring means connected to said means at said one end of said second shaft for holding said means at said one end of said second shaft in two given positions, and means at the other end of said second shaft for selectively rotating said second shaft into two different positions corresponding to said two given positions.

6. A recorder for measuring the movements of a drill string in a drilling operation comprising a frame, a first shaft rotatably mounted in said frame, means for rotating said first shaft in response to the movements of the drill string, a collar keyed to said shaft, a lug projecting radially outwardly from said collar, a pen arm pivotally supported in said frame adjacent said collar, a pen mounted on one end of said pen arm for engaging a chart and for marking a record thereon, means for resiliently biasing said pen arm into a given reference position, a pivotal plate pivotally mounted on said pen arm, a leaf spring mounted on said pen arm bearing against said pivotal plate and having a projecting portion thereon, means for moving said pivotal plate so that the projecting portion is movable into and out of the circumferential path of movement of said lug, whereby, when the projecting portion is in the path of said lug, said lug will move said pen arm away from said given reference position against the force of said biasing means to deflect said pen across said chart, a second shaft mounted in substantially parallel relation with said first shaft, a sleeve freely rotatably mounted on said second shaft, a first radial arm keyed to one end of said sleeve, a link connected between said first radial arm and one end of said pivotal plate whereby movement of said sleeve through a given arc will cause said pivotal plate to move into and out of position with respect to the path of movement of said lug, a second radial arm keyed to the other end of said sleeve, a curved arm pivotally mounted on a support adjacent to said second radial arm, a first disc eccentrically mounted on the free end of said curved arm, a link connected between said first disc and said second radial arm, a third shaft rotatably mounted in said support and having keyed thereto a second disc around which said curved arm is bent, an abutment on said arm projecting radially inwardly toward said third shaft, a pin eccentrically mounted on said second disc and engageable with the abutment on said arm for deflecting said arm in response to rotation of said third shaft, means for resiliently urging said curved arm in such a direction that the abutment thereon is in the path of movement of the said eccentrically mounted pin, a first gear mounted on one end of said third shaft, a second gear mounted on said first shaft in driving relation with said first gear, a reset arm keyed to one end of said second shaft adjacent said curved arm for engaging the free end of said curved arm and for moving said curved arm in response to the rotation of said second shaft against the force of said resiliently urging means for said curved arm into a position where said abutment is removed from the path of said eccentric pin, a spring means connected to said reset arm for holding said reset arm in two given positions, and a handle at the other end of said second shaft for selectively rotating said second shaft into two different positions corresponding to said two given positions of said reset arm.

References Cited in the file of this patent

UNITED STATES PATENTS 2,883,256    Nichols _____ Apr. 21, 1959